J. W. COREY.
Seed-Planter.
No. 12,672.
Patented Apr. 10, 1855.
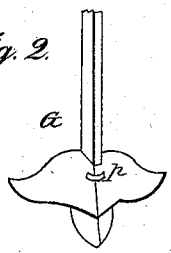
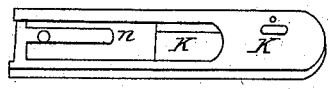
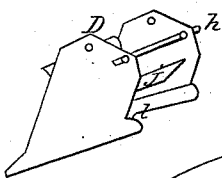
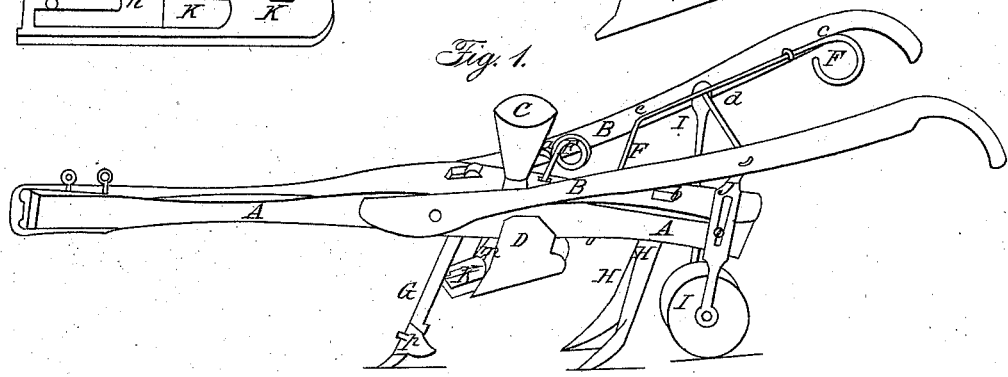
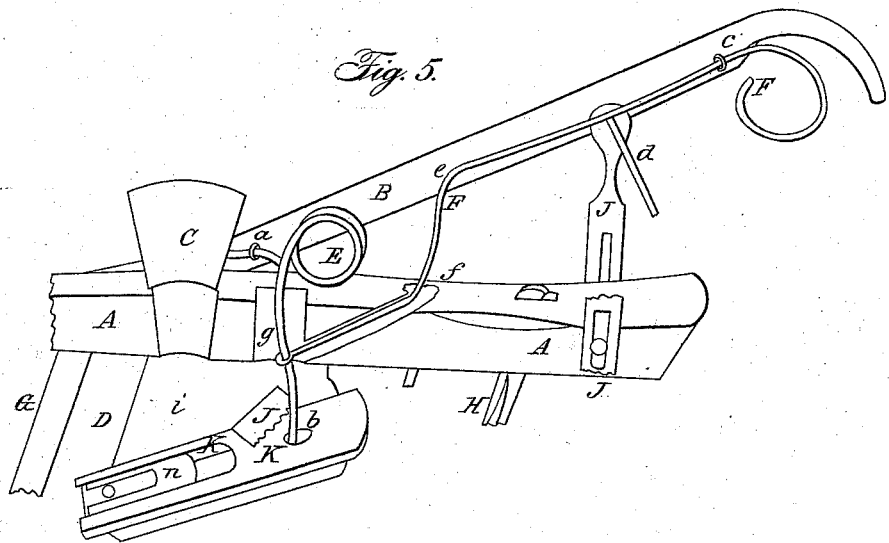

UNITED STATES PATENT OFFICE.

JASON W. COREY, OF CRAWFORDSVILLE, INDIANA.

IMPROVEMENT IN SEED-PLANTERS.

Specification forming part of Letters Patent No. 12,672, dated April 10, 1855.

*To all whom it may concern:*

Be it known that I, JASON W. COREY, of Crawfordsville, in the county of Montgomery and State of Indiana, have invented a new and useful Improvement in Seed-Planters, of which the following is a specification.

The nature of my invention consists in the peculiarly-shaped adjustable slide-box D, to be placed below the hopper and beam of seed-planter, in manner and for purposes set forth, and combining therewith a simple and improved seed-planting apparatus.

I declare the following a full, clear, and exact description of the construction and operation of my machine, reference being had to the annexed drawings, making a part of this specification.

Figure 1 is a perspective view of the machine. Fig. 2 is a section showing the front share with the adjustable clod-mover attached. Fig. 3 is a view of the adjustable slide; Fig. 4, a view of the slide-box. Fig. 5 shows the construction and operation of the connecting-rod, coiled spring, and slide.

The handles B B are attached to the beam A A, as on an ordinary shovel-plow.

C is the hopper for the passage of the seed through the beam to the slide box D. The slide-box D is appended below the beam by a bolt, $h$, in Fig. 4; and it is constructed with a chamber to receive the corn from the hopper and for the operation of the adjustable slide K, which construction and operation are fully shown in Figs. 1, 4, and 5 of the drawings.

The coiled spring E, fixed to the right handle at the point $a$, Figs. 1 and 5, penetrates the beam, as in Fig. 5, and is connected to the adjustable slide K through a slot, $o$, in Fig. 3.

F F is the connecting-rod, which commences at the bend in the right handle, runs from thence down the handle and through the beam, as in Fig. 5, and is looped at the point $g$ to the coiled spring E. This connection of the adjustable slide K and coiled spring E and connecting-rod F is for the purpose of enabling an operator to drop the seed by a simple upward motion of the finger at the handle instantaneously and at the point he pleases.

The front share, G, with its adjustable clod-mover $p$ attached, is shown in Fig. 2.

I is a roller, grooved to give proper form to the hill, and adjustable upward and downward by means of the slots in the arms J J of the handles. The arms J J, from supporting the handles, incline inward to the beam, from whence they continue down and form hangers for the roller.

The adjustable slide K (represented in Fig. 3) is made adjustable by the seed-gage $n$ in Fig. 3, screwed to the upper surface, for enlarging or diminishing the aperture in the slide. It is thus made adjustable for the purpose of enabling the operator to drop one or more grains at his pleasure.

The covering-shares H H are attached to the beam and reversible, so as to throw the earth outward instead of inward.

The machine is operated as follows: It is intended for one or more horses. The operator governs it by inserting the first finger of the right hand into the ring of the connecting-rod F F. When the seed is to be dropped the rod is pulled upward, and, being looped to the coiled spring, pulls the spring upward, carrying with it the regulating-slide K, in the aperture of which is the seed to be dropped.

The machine may be converted into a cultivator by removing the bolt which appends the slide-box to the beam, thus removing the box, and, if desired, by reversing the shares H H.

Disclaiming all devices, separately considered, except the adjustable seed or slide box D, which I claim as constructed, arranged, and described, I claim—

The arrangement of adjustable slide K, adjustable seed-gage $n$, coiled spring E, and connecting-rod F, together with grooved roller I, slotted arms J J, front share, G, adjustable clod-mover $p$, and covering-shares H H, as set forth and operated.

JASON W. COREY.

In presence of—
LEW WALLACE,
JOHN SHINN.